3,483,015
METHOD FOR PRODUCTION OF POROMERIC
FIBROUS SHEET MATERIALS
Osamu Fukushima, Kazuo Noda, Tamon Kishida, and Toshiharu Ochi, Kurashiki, Japan, assignors to Kurashiki Rayon Co., Ltd., Kurashiki, Japan
No Drawing. Filed Jan. 27, 1966, Ser. No. 523,278
Claims priority, application Japan, Feb. 3, 1965, 40/5,746; Aug. 2, 1965, 40/46,900
Int. Cl. C08c *17/16;* B44d *1/09*
U.S. Cl. 117—63                                14 Claims

ABSTRACT OF THE DISCLOSURE

Microporous sheet material for an artificial leather is produced by the combination of the steps of:
 a solution, containing a mixture of polyurethane elastomer and from 0.1 to 50 weight percent based on the polyurethane elastomer of a coagulation regulating agent, in an organic solvent, is applied inside or on the surface of a substratum;
 the applied substratum is treated with a coagulating liquid, which is at least partially miscible with the organic solvent of said solution, to convert the solution to a cellular structure having inter-communicating micropores;
 and then the residual organic solvent and a coagulating liquid in the cellular structure are removed.

---

The present invention relates to a novel method for manufacturing flexible and tough poromeric sheet-like materials which have good gas permeabiilty and moisture permeabiilty.

The method of the invention is particularly useful in the manufacture of various substitutes for leather. It is characterized by the addition of a special coagulation regulating agent (sponge forming agent) to a solution of an elastic polymer, in the wet formation of sheet material from the solution of elastic polymer, whereby the sponge structure in the sheet material can be regulated to any desired state by the action of the coagulation regulating agent.

It has hitherto been known that elastic sheet-like materials can be made from solutions of elastomeric high-molecular weight substances. For example, a polyurethane solution is applied onto a woven cloth and is subjected to wet coagulation to obtain elastic sheet-like materials for applications such as imitation leather and the like.

Even if formed by wet coagulation, however, these film layers tend to form independent foams because of agglutination of polyurethane elastomers, and usually have only limited moisture permeability and almost no gas permeability. Accordingly these conventional sheet-like materials have constituted major disadvantages when using them for such applications as clothing, shoes, and other apparel.

Generally when a polymer is dissolved in a solvent and the solution thus obtained is coagulated in a liquid which is a non-solvent for the polymer but miscible with the solvent, the resulting product can have a sponge-like inner structure because of the removal of solvent and of a change in the volume caused in the course of coagulation.

The sponge structure varies by the type of the polymer, type and amount of the solvent to be used for the dissolution, type and temperature of the coagulating solution for use in the coagu'ation and precipitation, and other related factors, but in many cases, the pores in the sponge are independent of one another, irregular in size, and are distributed ununiformly. In order to give desirable shapes and properties to various sheet materials formed by wet process, many proposals have previously been made to freely regulate the sponge structure. In particular, the studies have been directed to polyurethane elastomers which are polymers having properties most adapted for the manufacture of tough sheetings. Under most limited conditions, some of methods proposed so far have attained some success. They include:

(1) A method of regulating the coagulation rate of polymer through adjustments of the affinity of coagu!ating solution and polymer and the miscibility of the coagulating solution and the solvent for polymer. For example, a method of regulating the coagulation rate by varying the mixing ratio of a solvent and non-solvent when a mixture of a solvent for polymer and a non-solvent for the polymer which is miscible with the solvent is used as the coagulating solution.

(2) A method of regulating the formation of spónge structure by the addition of a non-solvent for polymer which is miscible with the solvent for the polymer, to the solution of said po'ymer.

(3) A method of forming a sponge structure which differs from the one formed of a single polymer, by taking advantage of the difference in the coagulating rates of more than two types of polymers dissolved in a same solvent into the form of a mixed polymer solution and subjected to wet coagulation. This is based on a finding that, when solutions of different polymers dissolved in a same solvent are coagulated in a same bath, if the kinds of the polymers are different, the polymers are usual'y coagulated at different rates.

Through the regulation of coagulating rate in accordance with the method (1) above, the sponge structure inside the sheet material can be regulated to some extent so far as the size, evenness, uniformity in distribution, etc. of the sponge structure are concerned. However, the sponge pores still remain independently of one another, and hence no improvement in gas permeability and moisture permeability can be expected. The sponge structure produced on coagulation is broken, or even totally destroyed and eliminated in some cases, in the subsequent drying stage by the removal of the solvent for polymer which is contained in the sponge pores.

The method (2) above is intended to prevent formation of independent sponge pores by granulating the polymer beforehand and by enmassing the granules densely in the course of second coagulation, and it has enabled highly gas-permeable and moisture-permeable sheetings to be manufactured. However, the method is also disadvantageous because the coagulation must be effected in two separate stages, thus complicating the process and rendering the process control and operation cumbersome. Furthermore, the product according to the above method has a defect, that is, unsatisfactory tear strength, because the polymer is enmassed in the form of granules bonded altogether.

The method (3) above utilizes the difference or differences in cohesive forces or contractive forces among polymers which are produced when a mixed solution of more than two polymers of different coagulation rates is coagulated, and permits coagulation of the solution while forming uniform pores in the coagulated layer, and therefore makes mutually communicated sponge pores. Thus, the solvent for polymers can be easily washed off, and the product has good gas permeability, moisture permeability, and great tenacity. However, the types of polymers miscible and combinable to give satisfactory results in accordance with the above method are rather limited, and in many cases this method is not practicable because the difference in coagulation rates is not appropriate or because the mixed solution is so instable that phase separation tends to take place.

An object of the present invention is to provide flexible and tough sheet materials having high degrees of gas permeability and moisture permeability which consist of polymer layers composed essentially of polyurethane elastomers, and the method of manufacturing the same.

Another object of the invention is to provide flexible and tough sheet materials having high degrees of gas permeability and moisture permeability which consist of a fibrous layer impregnated with polymer and a porous polymer layer, and the method of manufacturing the same.

Still another object of the invention is to provide sheet materials which can make excellent imitations of leather including those having grain surfaces through free regulation of the size, shape, distribution of pores, etc. of the sponge structure inside polymer layers, and also can make fine imitations of suede and buck-skins by various after treatments of the polymer layers having sponge structures, and the method of manufacturing the same.

Other objects of the invention will become apparent from the following description in the specification.

The novel method of the invention comprises: (a) dissolving in a solution of a polymer containing at least 50% by weight of a polyurethane elastomer in an organic solvent, a substance (which is hereinafter referred to as a coagulation regulating agent) which is soluble in the solvent of the above solution but insoluble or hardly sluble in the coagulating liquid which is used in the later step (c), and has a moderate degree of miscibility with said polyurethane elastomer; (b) applying a layer of the solution prepared by the step (a) inside or on the surface of a substratum; (c) treating said layer with a bath comprising a non-solvent (hereinafter referred to as a coagulating liquid) for said polymer which is at least partially miscible with said organic solvent to obtain a cellular structure having fine communicated pores; (d) removing said solvent from the layer thus obtained; and (e) removing said non-solvent from the resulting layer.

As the polymer useful for the step (a) above, practically every polymer is applicable which is precipitated by wet coagulation to any desired shape. For use in the manufacture of sheet materials for imitation leathers which is one of the principal objects of the invention, a polyurethane elastomer or a mixture of other polymers which contain more than 50% by weight of polyurethane elastomer is desired.

The polyurethane elastomer may be a so-called diamine-type polyurethane elastomer prepared by capping a polyalkylene ether glycol having hydroxyl groups on both terminals such as polyethylene ether glycol, polypropylene ether glycol, polytetramethylene ether glycol, or polyhexamethylene ether glycol, or a polyester glycol having hydroxyl groups on both terminals such as polycaprolactone obtained by subjecting lactone to ring-opening polymerization or a polyester glycol obtained by the reaction of glycol and dicarboxylic acid and having hydroxyl groups on both terminals, such as polyethylene adipate, polypropylene adipate, polyethylene propylene adipate, polybutylene adipate, polypentamethylene adipate, or polyethylene sebacate with an organic diisocyanate such as tolylene diisocyanate, p,p'-diphenylmethane diisocyanate, naphthylene diisocyanate, hexamethylene diisocyanate, or phenylene diisocyanate, and further by extending the chain with a diamine such as hydrazine hydrate, hexamethylene diamine, p,p'-diaminophenylmethane; or a so-called diol type polyurethane elastomer prepared by extending the chain of said polyalkylene ether glycol or polyester glycol with an organic diisocyanate and a diol compound such as ethylene glycol, propylene glycol, butylene glycol, pentamethylene glycol, diethylene glycol, tetraethylene glycol, N-methyl diethanolamine, or p,p'-diphenylol alkane. These polymers, diols, diisocyanates, and diamines may be used in combination.

As the other polymer which is used in mixture with the polyurethane elastomer in the step (a) above, use may be made of any polymer which is miscible or mutually diffusible with the polyurethane elastomer, for example, polymethacrylate, polyacrylate, a copolymer of acrylate and methacrylate, polyvinyl chloride, polyvinyl acetate, polyacrylonitrile, polystyrene, polyamide, or modified polyamide. Also, a mixture of these polymers may be used.

As the organic solvent for polymer to be used in the step (a) use may be made of any solvent which can dissolve polyurethane elastomer which is an essential component and the polymer to be added, for example, dimethyl formamide, dimethyl sulfoxide, dimethyl acetamide, tetrahydrofuran, or dioxane. They can be used singly or in combination and if necessary mixed with such an amount of a non-solvent which will not prevent the dissolution.

Although it is possible to mix a dye, pigment, plasticizer, stabilizer, or antistatic agent in the polymer solution so as to improve the colourability or other properties of the sheet materials to be produced, such additives as dyes and plasticizers often affect the sponge structures of the products adversely. Accordingly in using the coagulation regulating agents in accordance with the present invention, when using dyes and plasticizers the amount of said substance added and other factors must be carefully considered. Practical amounts of said agents added will be explained in the examples of the invention disclosed hereinafter.

Next, mention will be made of the substratum to be used in the step (b) above. Leather substitutes and other vapour-permeable reinforced laminate sheets can be manufactured by applying a layer or solution on the surface or to the inside of flexible, porous fibrous substrata, e.g. non-woven cloth, water leaves, or woven or knitted fabrics. The fibres in a substratum may be natural or synthetic, crimped or linear, organic or inorganic, continuous filaments, staple fibres or a length adapted for making paper.

A film or sheet of microporous structure which is devoid of any back up layer is obtained by applying a layer of solution on a removable substratum, preferably polished glass, stainless steel, aluminium foil, plastic film, or on a smooth, impermeable substratum such as a fibrous substratum covered with a loose coat, and then treating the resulting assembly with a necessary bath, removing the solvent, drying and finally peeling off the film from the substratum.

The coagulating liquid to be used for the bath treatment of the layer of the polymer solution in the step (c) above is, in principle, any liquid which will not dissolve most of the polymer and is miscible with the solvent for the polymer, for example, water, methanol, isopropanol, or toluene. They can be used either singly or in mixture. A mixed solution of a solvent and non-solvent for the polymer, e.g. a mixed solution of dimethyl sulfoxide-water, dimethyl formamide-water, or dimethyl formamide-methanol can be a desirable coagulating liquid as it delicately regulates the sponge structure of the polymer layer if the ratio of the solvent to non-solvent is varied cleverly.

The step (d) is intended for removal of the solvent from the polymer layer of microporous structure thus obtained. While it is desirable, if possible, to eliminate substantially the entire amount of the solvent, it is not always necessary to do so in the step (d) in the method of the invention. The removal of solvent can be accomplished by treating the polymer layer under drying conditions, for example in an oven or similar other heating zone, but it is preferable to treat the layer of microporous structure with a bath of water or other nonsolvent for the polymer which is at least partially miscible with the solvent for the polymer in said layer.

Removal of the non-solvent in the step (e) above is naturally accomplished by drying said layer.

According to the invention, as above described, the coagulation regulating agents as will be described in detail later are added to and dissolved in the polymer solution, and the resulting polymer solution is formed into a sheet and then coagulated, in the course of which coagulation, the coagulation regulating agents precipitate as crystals (1), obstruct conglomeration of the polymer in the course of coagulation (2), or phase separate from each other in the form of liquids in the layer (3), thereby achieving regulation of the sponge structure. These coagulating agents behave differently depending on the amount of said coagulating agent added, type of polymer, type of solvent in the polymer solution, temperature of the solution, and type and temperature of the coagulating liquid. Particularly the temperatures of the polymer solution and coagulating liquid are important. Even if it is believed that the sponge structures are regulated in the same mechanism, the details of sponge structures generally vary by the types of coagulation regulating agents used. The present invention utilizes such phenomena to regulate the sponge structures of coagulated polymer layers.

It is an outstanding feature of the method of the invention that the sponge structures of coagulated polymer layer are formed not by the contraction of the polymers in the course of coagulation but by forcibly forming given sponge pores. In other words, the polymer layers are foamed by special coagulation regulating agents. However the foaming is not accomplished by generation of gas as is usually in practice, but as above described by (1) deposition of the coagulation regulating agents in the layers as crystals, (2) obstruction of the aggregation of the polymer by said agents, or (3) phase separation of the agents from the polymers, in the course of coagulation of the polymers. The coagulation regulating agents in the stage where the polymer layers develop the sponge structures are in liquid phase or solid phase. Therefore, the coagulation regulating agents for use in the present invention must dissolve in the polymer solutions, and must be insoluble or hardly soluble in the coagulating liquids for the polymers.

In the case of (1) above, or where sponge pores are formed by deposition of crystals, the sponge pores communicate with one another, and hence the products have very good gas permeability and moisture permeability. The more thoroughly the crystals are grown, the higher the gas permeability and moisture permeability, and the greater the flexibility is.

In the case of (2) above, or where sponge pores are formed by the obstruction of aggregation of polymers by dissolved coagulation regulating agents, the polymer coagulates in granular state, so that the products thus obtained have a marked difference in structures from those formed by the growth of crystals but possess substantially the same properties.

In the case of (3) above, or where sponge structures of polymer layers are regulated by the coagulation regulating agents dispersed in the layers of polymer solutions aggregated in the liquid form, the sponge pores are independent of one another, and hence the products are not highly gas- and moisture-permeable but possess good tear strength and tensile strength.

Thus, by suitably combining various coagulation regulating agents which have different reaction mechanisms and give different sponge structures with different properties, it is possible to regulate the sponge structures inside sheet materials as desired to manufacture sheetings of many different properties, shapes, and appearances. For example, in the manufacture of imitation leathers which is a major object of the invention, it is necessary to regulate freely and finely the inner structures of polymer layers, in order to form complicated structures which have delicate changes in the thickness direction of natural leathers and act different functions from synthetic articles. This has been made possible for the first time by the method of the invention.

If the method of the invention whereby coagulation regulating agents are added to polymer solutions is combined with the conventional method of regulating sponge structures, it is needless to say that sponge structures can be regulated over a broader range than ever.

The coagulation regulating agents for use in the present invention include alkyl alcohols, aliphatic carboxylic acids, carboxylates, glycols, ethers, ketones, and aldehydes which have relatively large numbers of carbon atoms. To be more definite, the useful alkyl alcohols include octyl alcohol, decyl alcohol, lauryl alcohol, myristyl alcohol, cetyl alcohol, stearyl alcohol, eicosyl alcohol, docosyl alcohol, tetracosyl alcohol, hexacosyl alcohol, octacosyl alcohol, and myrisyl alcohol, which have 8 to 31 carbon atoms.

The useful aliphatic carboxylic acids include caprylic acid (octanic acid), capric acid (decanic acid), lauric acid, myristic acid, palmitic acid, stearic acid, arachic acid, and melissic acid which have 8 to 31 carbon atoms. Also, aldehydes of these acids are useful as coagulation regulating agents.

The carboxylates include esters of aliphatic carboxylic acids having 6 to 18 carbon atoms and alkyl alcohols having 1 to 6 carbon atoms, esters of aliphatic carboxylic acids having 1 to 18 carbon atoms and alkyl alcohols having 8 to 18 carbon atoms. Monoesters, diesters, and triesters of aliphatic carboxylic acids having 10 to 22 carbon atoms and glycerine, and monoesters, diesters, and triesters of aliphatic carboxylic acids having 10 to 22 carbon atoms and sorbitane can also be useful coagulation regulating agents.

As diols having hydroxyl groups on both terminals, use may be made of $\alpha,\omega$-glycols having 6 to 22 methylene groups such as 1,6-hexane diol, 1,10-decane diol, 1,18-octadecane diol, etc. As ethers, those which contain one or two alkyl groups having 6 to 18 carbon atoms, such as didodecyl ether and methyl stearyl ether may be used. Of ketones, those which contain one or two alkyl groups having 6 to 18 carbon atoms such as dinonyl ketone and methyl cetyl ketone are used advantageously.

It is a fundamental benefit of the present invention that such a wide variety of substances can be adopted as the coagulation regulating agents. These coagulation regulating agents are suitably soluble in the ordinary solvents for polyurethane elastomers, e.g. dimethyl formamide, dimethyl acetamide, dimethyl sulfoxide, tetrahydrofuran, and dioxanic acid, and are insoluble or hardly soluble in usual coagulating liquid (water in most cases) for the polymer solutions composed essentially of polyurethane elastomers, and have suitable affinity to polyurethanes.

Above all, crystallizable coagulation regulating agents are highly effective because their crystallization can be finely controlled by temperatures. For example, if a polymer solution containing a crystallizable coagulation regulating agent is allowed to coagulate in a bath at a temperature adjusted to a point below the melting point of said coagulation regulating agent, the regulating agent will be separated immediately with the coagulation of the polymer and the crystals occupy a certain space, forming nuclei for the coagulating reaction and attracting the polymer around the crystals on coagulation, and thereby producing sponge pores. At this time, the sponge structure depends first of all upon the separating rates of the polymer and coagulation regulating agent. If the polymer is crystallized very rapidly, the effect of the coagulation regulating agent is difficult to appear. In the case to the contrary, sponge pores which faithfully reproduce the shapes of crystals will result. Of course, the sponge pores will have more different contours from the natural forms with an increase in the amount of coagulation regulating agent added. While the coagulation rate of the polymer and the separation rate of the regulating agent are both governed by the temperature of the coagulating liquid to be employed, they depend on the latter to different degrees, and hence the sponge structure is finely varied with the change of the temperature of the coagulation bath. Especially, the separation and growth rates of crystals are controllable almost continuously, to a great advantage in operation. If the coagulation is effected at a temperature which narrowly permits separation of crystals, the crystals will grow to large size, and accordingly the sponge pores thereby formed will be large and continuous. Conversely if the coagulation is effected at a very low temperature, crystals will be separated all at once, and will form fine and uniform sponge pores.

When two types of crystallizable coagulation regulating agents are used together, the effects thereby achieved upon a sponge structure are additional because the phenomenon of crystallization is usually not mutually interruptive. Thus, if conditions are chosen so that one of the coagulation regulating agents can rapidly crystallize while the other can be separated after full growth, a sponge structure having large and continuous sponge pores together with fine and uniform pores will be formed.

To attain such effects as expected, it is convenient to use the coagulation regulating agents which belong to the same series but which differ in the number of carbon atoms, because the differences in the number of carbon atoms brings minor changes in the melting points, crystallizing temperatures, affinity to solvent and coagulation liquid, and other properties of the agents. Also, it is commercially advantageous to utilize the crystallization which is a very simple phenomenon and is highly reproducible.

Separation of crystals in the course of coagulation is not solely governed by the temperature but is promoted by the impregnation with a coagulating liquid which is poorly affinitive to the coagulation regulating agents. Naturally, for this reason, the condition of crystallization varies with the type of coagulating liquid adopted. The coagulation regulating agents are influenced by the coagulating liquid in the same way as the polymer is influenced in the course of coagulation, and the crystallization of the coagulation regulating agents can be finely controlled by choosing a suitable type of coagulating liquid, just in the same manner that the polymer coagulation can be regulated to some extent by means of the coagulating liquid. Further, it is enabled to form a much greater variety of sponge structures than heretofore by combining the method of the invention with the conventional method for regulating the coagulating rates of polymers and other methods for regulating sponge structures commonly in practice.

Of the coagulation regulating agents useful in the invention, those which effectively regulate sponge structures by separation of crystals are alkyl alcohols having 12 to 31 carbon atoms and aliphatic carboxylic acids having 8 to 31 carbon atoms. Among these, the alcohols having 14 to 22 carbon atoms and carboxylic acids having 10 to 18 carbon atoms are preferred in the light of relation of ordinary temperature conditions of the coagulation bath for the polymer solution to melting point of the coagulation regulating agent and solubility of the polymer in the solvent, and other factors.

If a coagulation regulating agent having a melting point of more than 70° C. is employed, separation will take place unless the polymer solution is maintained at a sufficiently elevated temperature, and the crystals will not grow and the effect of the agent will be limited unless the temperature of coagulation liquid is kept correspondingly high.

If a coagulation regulating agent of a melting point of higher than 90° C. is used, usually control of the polymer solution and coagulating liquid will become so cumbersome that it will be almost impracticable from an industrial standpoint. Conversely if a coagulation regulating agent having a too low melting point is added to the polymer solution, the temperature of the coagulating liquid must be kept low enough to obtain the effect of crystallization. In this case, it is relatively easy to lower the temperature of coagulating liquid, but the coagulation rate of the polymer itself will be retarded, to an industrial disadvantage.

Low-molecular alcohols and acids are highly soluble in the solvents for polymers, and therefore must be used in large amounts in order to achieve the same effects as by other compounds. For the reasons above explained, coagulation regulating agents having melting points in the range of 30 to 70° C. are most desirable where sponge structures are to be regulated by separation of crystals. Of the crystalline shapes, needles are most suitable for manufacturing tough sheet materials which have high gas permeability and moisture permeability.

Aliphatic carboxylic esters of alkyl alcohols are also effective in regulating sponge structures through crystallization. To cite stearic esters for example, the compounds ranging from ethyl stearate to octadecyl stearate can be used in the regulation of sponge structures.

Aldehydes, ethers, and ketones of melting points substantially in the same ranges can be utilized. Useful $\alpha,\omega$-glycols range from hexane diol to octadecane diol.

Coagulation regulating agents for use in regulation of sponge structures not by separation of crystals but by dispersion in liquid form in the layers of polymer solutions or by obstruction of aggregation of polymers in the course of coagulation include monesters, diesters, and triesters of aliphatic carboxylic acids having 10 to 22 carbon atoms and glycerine, and monoesters, diesters, and triesters of aliphatic carboxylic acids having 10 to 22 carbon atoms and sorbitane. They have relatively high melting points and have very poor affinity to coagulating liquids, particularly water, but will not be separated in the form of clearcut crystals, and therefore their mechanisms of actions are not dependent on crystallization. Other coagulation regulating agents consisting of alkyl alcohols, aliphatic carboxylic acids, glycols, ketones, ethers, and aldehydes, when coagulated under the conditions which do not permit their crystallization, will form sponges by the same mechanisms as of glycerides and sorbitane esters.

When a polymer solution to which a crystallizable coagulation regulating agent is added is coagulated by a coagulating liquid adjusted to a temperature higher than the melting point of said regulating agent, and when a coagulation regulating agent which will not form clearcut crystals is employed, the mechanisms of actions will be entirely different from each other. If the coagulation regulating agent used is more sensitive to the inflow of coagulating liquid than the polymer, the regulating agent will cohere in liquid form and will be dispersed in the layer of polymer solution before the polymer is separated, in the early stage of coagulation, and then will compel the polymer aggregated therearound to form pores. Also, when a coagulation regulating agent remains uniformly dissolved while the layer of polymer solution is about to coagulate and contract, the agent obstructs the natural aggregation of the polymer and cuts the polymer in the course of coagulation into fine pieces, and thus prevents formation of large independent foams.

By the use of a coagulation regulating agent which will not crystallize under certain coagulating conditions in combination with another regulating agent which will crystallize under the same conditions, or by the combined use of a non-crystallizable and crystallizable coagulation regulating agent, it is possible to obtain sponge structures which combine the ones produced individually by the respective agents. Such combined use of coagulation regulating agents is desirable for the purpose of forming flexible and tough sheet-like materials which have good gas permeability and moisture permeability.

The amounts of various coagulation regulating agents to be added in accordance with the invention may be suitably chosen depending upon the sponge structures desired, types of polymers to be used and the solvents therefor, and types and temperatures of coagulating liquids. Usually, an amount of 0.1 to 50% by weight of the regulating agent is sufficient for the total amount of polymer to be used. The porosity or space factor of a sheet-like material having a sponge structure is regulatable over a range of 25% to 80%, or from coarse structure to dense one, when calculated on the basis of the specific gravity of the polymer used and the apparent specific gravity of the sheet-like material produced. However, the coagulation regulating agent to be added must not be solely responsible for the porosity, but has only to occupy a certain space by separation in the course of wet coagulation, thereby to form the nuclei for coagulating reaction and to obstruct ununiform and dense aggregation of the polymer. It may therefore be added in an amount of only 0.1 to 50% by weight, though the range depends on the type of coagulation regulating agent to be used, coagulation temperature, and other determinants.

Although some typical types of coagulation regulating agents, amounts to be added, coagulation temperatures, and types of coagulating liquids, are introduced in the examples of the invention given hereunder, it should be noted that, for example, in order to give a sponge structure suitable for a buck-skinlike sheet material to a polyurethane elastomer film prepared by wet process, docosanol having 22 carbon atoms can prove effective when added in an amount of only 0.5% to the total amount of the polymer, if a polymer solution of the composition and the coagulating conditions which tend to produce a sponge are used, but in order to produce a similar sponge structure with the use of lauryl alcohol having 12 carbon atoms under the conditions which discourages sponge formation, the compound must be added in an amount of 30% to the total amount of the polymer.

The coagulation regulating agent used in forming a sponge may be dissolved and discharged simultaneously with the removal of the solvent for polymer by washing the polymer with hot water following coagulation of the polymer. Alternatively it is possible to dissolve the agent off by the use of an organic solvent which is capable of dissolving it and from the resulting solution it is recovered and reused. As already described, the sponge structures prepared in accordance with the invention are in most cases formed of continuously communicating pores, and hence removal and recovery of the coagulation regulating agent are facilitated. Another advantage is derived from the fact that the regulating agent itself undergoes no change by repetitive use and can be employed many times after recovery, because the actions of the additive upon the sponge structure are based on the physical change of crystallization or separation from the solution. Further, it is not necessary in many cases to remove the coagulation regulating agent from the polymer layer because there is no material effect caused whether the agent is removed from the layer or not.

If the method of the invention is applied to the method most commonly in practice for the manufacture of imitation leathers which consists of impregnating a tridimensionalized needle-punched non-woven fabric, with a polymer solution composed essentially of a polyurethane elastomer, coagulating the impregnated cloth by wet process, and then coating the surface of the substratum again with a polymer solution composed essentially of a polyurethane elastomer, and finally subjecting the coated substratum to wet coagulation, it is possible to obtain products which have far greater similarity to natural leathers in structure, properties, and performance than the conventional imitations. One of the defects of ordinary imitation leathers is that their textures are such that they lack the softness and flexibility of natural leathers. This is attributed mainly to the strong bonds of fibres of tridimensionalized non-woven cloth which are produced by the polymer impregnating the cloth. If, however, a coagulation regulating agent which will obstruct aggregation of polymer in the course of coagulation and coagulate the polymer in the granular form is added to the polymer solution with which the tridimensionalized non-woven cloth is to be impregnated, a substratum having a very soft and flexible texture can be obtained because not only the polymer itself is flexible but also the polymer will not cause unnecessary mutual adhesion of the non-woven fibres. Of course, the substratum thus prepared is highly gas-permeable and moisture-permeable. Further, if the desired product is a fine imitation of natural leather having a grain surface, then the surface to be formed on the substratum is obtained by adding a coagulation regulating agent which is dispersed in liquid form in the layer of polymer solution in the course of coagulation and a little amount of another regulating agent which deposits crystals on coagulation to the polymer solution to be used for coating purpose. Thus, a tough and well craped surface having good gas permeability and moisture permeability is obtained.

To attain satisfactory craping, a sponge structure of uniform pore distribution and fine density prepared by a coagulation regulating agent dispersible in liquid form is indispensable. Also, because the sponge pores which are usually independent of one another are mutually communicated by the action of a crystallizable coagulation regulating agent, the product can have improved gas permeability and moisture permeability.

If the desired product is an imitation suede or buckskin, the coated film must have a structure different from that of the grain surface. For this purpose, a somewhat large amount of a crystallizable coagulation regulating agent is added to the polymer solution to be used for coating, and crystals are formed in the course of coagulation to form sponge pores, and then the skin of the spongy polymer layer thus prepared is peeled off thereby to expose the sponge structure. By regulating the sponge structure through selection of suitable type and amount of coagulation regulating agent and control of coagulating conditions, various surfaces are obtained after removal of skins, including coarse suede-like surfaces and fine buck-skin-like ones.

In contrast to natural leathers which have structures increasingly dense toward the surface on the front side, imitation leathers most commonly available today are generally composed of two layers of different structures, i.e. substratum and coated layer. To form the two layers of different structures, it has been necessary to coagulate the substratum and coated layer under separate and most limited coagulating conditions.

According to the method of the invention, however, the coagulation regulating agent to be added to the polymer solution to form the substratum layer and the agent to be added to the solution for coated layer may be suitably chosen and combined, whereby the two layers are allowed to coagulate in a single step of process and desirable sponge structures are formed in both layers, and the manufacturing process can be simplified to a remarkable industrial advantage.

The method of the invention is illustrated by the following examples, in which all the percentages are by weight, and the amount of coagulation regulating agent added is given in terms of percent of the total weight of polymer, and viscosity values are given as measured at 30° C.

EXAMPLE 1

As the polymer, a polyurethane elastomer composed of polyethylene propylene (molar ratio=ethylene:propylene=9:1) adipate, having a mean molecular weight of 2,000 and hydroxyl groups on both terminals, p,p'-diphenylmethane diisocyanate, and ethylene glycol (molar ratio 1:5:4) was employed.

To 22% dimethyl formamide solution of this polyurethane elastomer, stearyl alcohol and carbon black treated with metallic soap were added in amounts of 5% each to the total amount of the polyurethane, and dissolved and dispersed into the solution, to a viscosity of 50 poises.

Since stearyl alcohol has a melting point of 58° C., it separates out if the temperature is dropped below 30° C.

(A) This polymer solution was heated to 40° C., flown and spread over a flat, smooth plate, to a thickness of 1 mm., and immediately coagulated with 30% aqueous solution of dimethyl formamide at a temperature adjusted to 27±0.1° C. over a period of 15 min. Next, the coagulated film was washed with hot water at 70° C. for 30 min., and then dried with hot air at 80° C. to obtain a film of uniform sponge structure. The film had a thickness of 0.49 mm. and an apparent specific gravity of 0.42. This film was bonded by lamination on a substratum of synthetic leather having a thickness of 0.80 mm. which was formed by impregnating a needle-punched tridimensionalized non-woven cloth with a solution composed essentially of the polyurethane elastomer and then coagulating the solution by wet process. The final product obtained by removing the film skin by 0.20 mm. buffing was a sheet very similar to a buck-skin in outward appearance, touch, and texture.

(B) The same polymer solution as used in the above procedure was heated to 40° C., flowed over a flat, smooth plate, to a thickness of 1.2 mm., and immediately allowed to coagulate with 30% aqueous solution of dimethyl formamide adjusted to a temperature of 85°±0.1° C. for 15 min., and then was washed and dried in the same manner as described in (A) above.

The film thus obtained was 0.63 mm. in thickness and 0.40 in apparent specific gravity. Inside the film, sponge pores were present which were visually observable and larger in size than those of the film obtained by the procedure (A). This film was bonded by lamination on the same substratum as used in the procedure (A), and the film skin was removed by 0.25 mm. buffing to obtain a sheet just like suede in outward appearance, touch, and texture.

(C) The same polymer solution as used in the preceding procedures was heated to 50° C., flown and spread over a flat, smooth plate, to a thickness of 0.8 mm., and immediately allowed to coagulate with 50% aqueous solution of dimethyl formamide adjusted to a temperature of 45±0.5° C. for 15 min. Thereafter, in the same way as in (A), the resulting product was washed and dried. The film thus produced was 0.34 mm. in thickness and 0.52 in apparent specific gravity. A section of this film showed no sponge pores which were visible with the naked eye. This film was bonded by lamination on the same substratum for synthetic leather as employed in the procedure (A), and the surface was embossed resulting in a leather-like sheet having a grain surface.

When folded inwardly, this sheet showed crapes similar to those of natural calf skin.

(D) The same polymer solution as used above was heated to 50° C., flowed over a flat, smooth plate, to a thickness of 0.88 mm. It was allowed to coagulate over a period of 15 minutes with 50% aqueous solution of dimethyl formamide adjusted to a temperature of 63±1° C., and then, in the same manner as in (A), washed and dried. The film had a thickness of 0.31 mm. and an apparent specific gravity of 0.57. In section, the film showed no visually observable sponge pores. The film was bonded by lamination on the same substratum for synthetic leather as used in (A), and the surface was embossed to obtain a leather-like sheet having a grain surface. The surface was hardly injurable.

The properties of the films obtained by the procedures (A), (B), (C) and (D) above are shown in Table 1.

TABLE 1

| Specimen No. | Tenacity (kg./cm.) | Ultimate elongation (percent) | Gas [1] permeability (time) | Moisture [2] permeability (g./m.²/24 hr.) |
| --- | --- | --- | --- | --- |
| A | 3.60 | 296 | 18 sec | 6,200 |
| B | 2.17 | 202 | 2 sec | 18,600 |
| C | 9.92 | 460 | 6 min | 3,400 |
| D | 13.41 | 513 | 4 hr. 26 min | 1,200 |

[1] JIS P,8, 117-1968 (the same testing method applies to the following examples).
[2] JIS Z-0208 (the same testing method applies to the following examples).

The buck-skin-like sheet (A) and suede-like sheet (B) bonded by lamination on substrata for synthetic leathers were adapted for such applications as ladies' shoes, handbags, watch bands, and interior decorative materials. The leather-like sheet with a grain surface (C) was adapted for use as uppers for shoes, furnitures, and room interior decorative materials. The sheet (D) was adapted for furnitures, room interior decorative materials, and industrial materials.

EXAMPLE 2

To 20% solution of the polyurethane elastomer as described in Example 1 in dimethyl acetamide, various alcohols were added in amounts of 5% each. The polymer solutions thus prepared with (A) octyl alcohol, (B) lauryl alcohol, (C) cetyl alcohol, (D) eicosyl alcohol, (E) hexacosyl alcohol, and (F) myrisyl alcohol were adjusted to a uniform viscosity of 15 poises and heated to 60° C. These polymer solutions were flown and spread over flat, smooth plates, to a thickness of 1 mm., and were allowed to coagulate with 30% aqueous solution of dimethyl acetamide and adjusted to a temperature of 25±1° C. for 30 min. Next, the coated films were washed with hot water at 70° C. for 30 min., and dried with hot air at 80° C. The shapes and properties of the films thus obtained are shown in Table 2.

TABLE 2

| Polymer solution | Coagulation regulating agent | Thickness (mm.) | Apparent specific gravity | Tenacity (kg./cm.) | Elongation (percent) | Gas permeability (time) | Moisture permeability (g./m.²/24 hr.) |
| --- | --- | --- | --- | --- | --- | --- | --- |
| A | Octyl alcohol | 0.48 | 0.42 | 5.10 | 360 | 44 min. 30 sec. | 4,200 |
| B | Lauryl alcohol | 0.54 | 0.86 | 4.98 | 818 | 40 sec | 8,100 |
| C | Cetyl alcohol | 0.55 | 0.95 | 4.44 | 295 | 12 sec | 8,000 |
| D | Eicosyl alcohol | 0.46 | 0.42 | 5.28 | 352 | 8 min. 20 sec. | 2,900 |
| E | Hexacosyl alcohol | 0.48 | 0.41 | 5.58 | 348 | 6 min. 20 sec. | 3,800 |
| F | Myrisyl alcohol | 0.48 | 0.42 | 5.02 | 364 | 6 min. 50 sec. | 2,600 |

The polymer solution (A) was suitably applied on thin and particularly soft and flexible substrata for synthetic leathers for the manufacture of leatherlike sheets for clothing. The polymer solution (B) was suitable for the manufacture of particularly flexible buck-skin-like sheets, and the polymer solution (C) was suitable for the manufacture of suede-like sheets.

The solutions (D), (E), and (F) had no appreciable differences in the structures and properties, and proved useful in making coated films for leatherlike sheets adapted for such uses as uppers of shoes, room interior decoration and furniture materials.

As controls, polymer solutions not containing any such coagulation regulating agents were treated in the same manner as the polymer solutions (A) to (F). Upon completion of coagulation, they had ununiform sponge structures containing localized large sponge pores. However, most of the sponge pores were destroyed in the course of drying, and when dry solid, the films had rough and unsmooth surfaces.

EXAMPLE 3

As the polymer, a polyurethane elastomer composed of polycaprolactone, having a mean molecular weight of 1,000 and hydroxyl groups on both terminals, p,p'-diphenylmethane diisocyanate, and tetramethylene glycol (molar ration=1:5:4) was used.

(A) To 25% solution of this polyurethane elastomer in dimethyl sulfoxide, 10% of palmitic acid was added, and the viscosity of this polymer solution was adjusted to 40 poises, and then the solution was heated to 60° C. Meanwhile, a substratum for synthetic leather was thoroughly impregnated with 30% aqueous solution of dimethyl sulfoxide, the air inside the substratum was completely removed, and then the liquid on the surface of the substratum was blown off by compressed air, and then, immediately, the substratum was coated with the polymer solution prepared beforehand, to a thickness of 1.0 mm. Next, the sheet thus coated with the polymer solution was allowed to coagulate with 30% aqueous solution of dimethyl sulfoxide adjusted to a temperature of 35±0.1° C. over a period of 30 min. On completion of the coagulation, the sheet was washed with hot water at 70° C. for 30 min., and then dried with hot air at 80° C.

The coated layer on the sheet-like material thus obtained contained thin and long foams which were visible with the naked eye. It has a thickness of 0.54 mm. When the skin of this coated layer was removed by 0.18 mm. by means of a buff machine composed of a rotary drum solution was allowed to coagulate with 30% aqueous covered with a #240 sand paper, the film paper was napped and gave a buck-skin-like appearance. This sheet was adapted for uses such as uppers for ladies' shoes, handbag, and room interior decorative materials.

(B) To 18% solution of the same polyurethane elastomer as used in the preceding procedure in dimethyl sulfoxide, lauric acid of 10% stearic acid of 3%, and anatase-type titanium oxide treated with metallic soap of 10% based on the polyurethane, were added, and dissolved and dispersed in the solution. This polymer solution was adjusted to a viscosity of 25 poises and heated to 50° C. This polymer solution was coated to a thickness of 0.8 mm. on a substratum for synthetic leather treated in the same manner as in the procedure (A) above, allowed to coagulate with 50% dimethyl sulfoxide solution adjusted to a temperature of 45±0.5° C. over a period of 30 min., and then, in the same way as in (A), washed with hot water and dried. The coated layer on the sheet material thus obtained had no visible pores, but the sheet had a gas permeability of 52 min. and moisture permeability of 3,200. When the surface was embossed and a lacquer was sprayed, a leather-like sheet useful as uppers of shoes was obtained.

EXAMPLE 4

(A) A needle-punched tridimentionalized nonwoven cloth of short fibres of 15-denier nylon, weighing 280 g./m.$^2$, was compressed and fixed to a thickness of 1.8 mm. with polyvinyl alcohol. Into 20% solution of the same polyurethane elastomer as described in Example 1 in dimethyl formamide, 12% of sorbitane monostearate was added and dissolved, and the ploymer solution was adjusted to a viscosity of 18 poises and heated to 60° C.

On the liquid surface of this polymer solution, the compressed non-woven cloth was kept still for 15 min. and allowed to be impregnated with said polymer solution. The non-woven cloth impregnated with about 1,200 g./m.$^2$ of the polymer solution was dipped and coagulated in 40% aqueous solution of dimethyl formamide adjusted to a temperature of 38±0.1° C. for 20 min. Next, it was dipped in water at 30° C. for 1 hour to complete the coagulation. Then, the resulting product was placed in hot water at 70° C., and washed over a period of 2 hours, while repeating press with a pressure of 300 kg./m.$^2$ at intervals of 10 min. By this, polyvinyl alcohol and dimethyl formamide were removed substantially competely. Upon completion of the washing, the product was dried with hot air at 80° C. and the rear side was smoothed by buffing. The sheet material thus obtained had a texture like a leather, and was adapted for use as a substratum for synthetic leather for shoes. The sheet had a thickness of 1.2 mm., specific gravity of 0.39, tensile strength of 17.5 kg./mm.$^2$, tear strength of 5.8 kg., and ultimate elongation of 68%.

(B) A needle-punched tridimensionalized non-woven cloth of short fibres of 1.0-denier nylon, weighing 400 g./m.$^2$, was compressed and fixed to a thickness of 2.0 mm. with a polyvinyl alcohol size.

Into 16% solution of the polyurethane elastomer as described in Example 3 in dimethyl acetamide, 3% of sorbitane dilaurate and 6% of glyceride monostearate were added and dissolved, and the resulting polymer solution was adjusted to a viscosity of 18 poises and then heated to 60° C.

On the liquid surface of this polymer solution, the non-woven cloth compressed beforehand was allowed to stand for 5 min. to complete the impregnation.

The non-woven cloth was impregnated with 1.6 kg./m.$^2$ of the polymer solution.

The impregnated cloth was dipped in 20% of aqueous solution of dimethyl acetamide adjusted to a temperature of 30±0.1° C. for 45 min., and then dipped in water at 30° C. for 1 hour to complete the coagulation. Then, in the same manner as in (A), the resulting product was washed with hot water and dried, after which the both sides were smoothened by buffing to a thickness of 1.6 mm. This sheet material was cut in two sheets of equal thickness by a band knife to obtain a sheet of a texture similar to that of a buff of natural leather.

The sheet had a specific gravity of 0.32, tensile strength of 1.04 kg./mm.$^2$, tear strength of 3.9 kg., and elongation of 84%.

(C) As the polymer, a polyurethane elsatomer composed of polytetramethylene glycol, having a mean molecular weight of 1,000 and which had hydroxyl groups on both terminals p,p'-phenylmethane diisocyanate, and ethylene glycol was used. To 12% solution of this polymer in dimethyl formamide, 8% of sorbitane disterate and 3% of methyl palmitate were added and dissolved therein. This polymer solution was adjusted to a viscosity of 10 poises and heated to 60° C.

A needle-punched tridimensionalized non-woven cloth of 2-denier mixed spun fibres of nylon and polystyrene (nylon:polystyrene=35:65) which weighed 170 g./m.$^2$, was compressed and fixed with polyvinyl alcohol size, and then allowed to stand on the liquid surface of the polymer solution prepared beforehand, for 5 min. thereby to impregnate the cloth with said polymer solution. After all, the non-woven cloth was impregnated with 650 g./m.$^2$ of the polymer solution. Next, the impregnated cloth was dipped in 30% aqueous solution of dimethyl formamide adjusted at a temperature of 30±0.1° C., and was left to stand for 30 min. to coagulate. Then, it was taken out and placed in water at 30° C. for 1 hour to complete the coagulation. In the same manner as in (A), the resulting product was washed with hot water, dried, and the both sides were smoothened by buffing to a thickness of 0.7 mm.

Next, this sheet was dipped in toluene at 80° C. and left to stand for 2 hours, while repeating press with a pressure of 100 kg./m.$^2$ at intervals of 5 min. By this step, polystyrene was completely removed from the mixed spun fibres of nylon and polystyrene. After the removal of toluene, the sheet was dried and treated with an anionic softening agent for finishing. The product was very flexible and had a calf skin-like texture. It was useful as a substratum for imitation leather for clothing use. The sheet had a specific gravity of 0.25, tensile strength of 0.4 kg./mm.$^2$, tear strength of 37 kg., and ultimate elongation of 70%.

EXAMPLE 5

(A) To 22% solution of the same polyurethane elastomer as described in Example 1 in dimethyl formamide, stearic aldehyde of 5% and carbon black treated with metallic soap of 5% based on polyurethane were added, dissolved and dispersed therein. The polymer solution was adjusted to a viscosity of 25 poises, and heated to 50° C.

A substream for synthetic leather prepared in the same manner as in (A) of Example 4 was impregnated with 50% aqueous solution of dimethyl formamide. After the air inside the substratum was completely replaced by the aqueous solution, the liquid on the surface of the substratum was blown away by compressed air, and immediately thereafter the surface was coated with the polymer solution to a thickness of 0.8 mm. The coated film was allowed to coagulate with 50% aqueous solution of dimethyl formamide adjusted to a temperature of 40±0.1° C. for 20 min., and then washed with hot water at 70° C. for 30 min., and dried with hot air at 80° C. The coated film of the sheet material thus obtained did not contain sponge pores of visually observable size, but the sheet possessed a gas permeability of 43 min. and a moisture permeability of 2,300 g./m.$^2$/24 hr. The surface was embossed and coated with lacquer to obtain a leather-like sheet having good appearance, texture, and craping. It was adapted for use as uppers for shoes.

(B) To 22% solution of the same polyurethane elastomer as described in Example 1 in dimethyl formamide, dioctadecyl ether of 5%, and carbon black treated with metallic soap of 5% based on the polyurethane elastomer, were added, and dissolved and dispersed therein. The polymer solution was adjusted to a viscosity of 25 poises and heated to 50° C.

The coated film of a sheet obtained by treating a material with the above polymer solution in the same manner as described in (A) above had no sponge pores which were visible with naked eyes, but had a gas permeability of 12 min. and a moisture permeability of 3,700 g./m.$^2$/24 hr. When the surface was finished, the product was just the same as the sheet (A).

(C) To 22% solution of the same polyurethane elastomer as described in Example 1 in dimethyl formamide, dinonyl ketone of 10%, and carbon black treated with metallic soap of 5% based on the polyurethane elastomer, were added, and dissolved and dispersed therein. The polymer solution thus prepared was adjusted to a viscosity of 25 poises and kept warm at 50° C. The coated film of a sheet obtained by treating a material with this polymer solution in the name manner as described in (A) above had no sponge pores which were visible with naked eyes, but the sheet had a gas permeability of 72 min. and a moisture permeability of 2,500 g./m.$^2$/24 hr. When finished on the surface, the product had a very close resemblance to the sheet (A).

(D) To 22% solution of the polyurethane elastomer as described in Example 1 in dimethyl formamide, octadecyl stearate of 5%, and carbon black treated with metallic soap of 5% based on the polyurethane elastomer, were added, and dissolved and dispersed therein. The polymer solution was adjusted to a viscosity of 25 poises, and kept warm at 50° C.

By the use of this polymer solution, the same material as used in (A) was treated in the same way. The coated film of the sheet material thus produced contained no visible sponge pores, but the sheet had a gas permeability of 40 min. and a moisture permeability of 2,800 g./m.$^2$/24 hrs. When surfaced, the product was not distinguishable from the sheet (A).

(E) To 22% solution of the polyurethane elastomer as described in Example 1 in dimethyl formamide, decane diol of 10%, and carbon black treated with metallic soap of 5% based on the polyurethane elastomer, were added, and dissolved and dispersed therein. The polymer solution was adjusted to a viscosity of 25 poises, and kept warm at 50° C. By the use of this polymer solution, the same material as employed in (A) above was treated in the same way. The coated film of the sheet thus obtained contained no visible sponge pores, but the sheet had a gas permeability of 18 min. and a moisture permeability of 4,300 g./m.$^2$/24 hr.

For comparison with the products obtained by the procedures (A) to (E), a polymer solution not containing the coagulation regulating agents was used to perform the similar treatment. The sheet thus obtained had a gas permeability of 4 hours and 53 min. and a moisture permeability of 1,800 g./m.$^2$/24 hrs.

EXAMPLE 6

Into a dimethyl formamide solution containing 15% of a polyurethane elastomer composed of polybutylene adipate of a mean molecular weight of 1,000 and having hydroxyl groups on both terminals, p,p'-diphenylmethane diisocyanate, ethylene glycol, and diethanol methylamine (molar ratio=1:2.5:1.2:0.3), and polymethyl methacrylate of 5%, docosyl alcohol of 1% and myristyl alcohol of 20% based on the polymer were added and dissolved. The polymer solution was adjusted to a viscosity of 30 poises and heated to 40° C.

The synthetic leather substratum for clothing use (having a thickness of 0.6 mm.) as described in (C) of Example 4 was impregnated with 50% aqueous solution of dimethyl formamide, the air inside the substratum was completely driven out, and then the liquid deposited on the surface of the substratum was blown away by compressed air. Immediately thereafter, the substratum was coated with the polymer solution prepared as above to a thickness of 0.8 mm., and the coated film was allowed to coagulate with 50% aqueous solution of dimethyl formamide kept at a temperature of 30±0.1° C. for 20 min. Upon completion of the coagulation, the resulting product was washed with hot water at 70° C. for 3 hours, and dried with hot air at 80° C. to obtain sheet having a thickness of 0.94 mm. This sheet was attached to a smooth flat plate, and the skin of the coated film was removed by 0.15 mm. by means of a belt sander. Then, the sheet was peeled off from the flat plate, and dipped in toluene at 80° C. for about 2 hours to extract the polymethyl methacrylate contained in the coated film. After removal of toluene, the sheet was dried, and finally treated for softening. It may be dyed with an acid dye prior to the softening treatment. The buck-skin-like sheet thus obtained was adapted for wear use.

EXAMPLE 7

Twenty parts of a polyurethane elastomer composed of polyethylene propylene (molar ratio of ethylene:propylene=9:1) adipate having a mean molecular weight of 2,000 and hydroxyl groups on both terminals, p,p'-diphenylmethane diisocyanate, ethylene glycol and diethanol methylamine (molar ratio 1:5:3:1), were dissolved in 65 parts of dimethyl formamide. To the solution thus prepared, 10% of an aqueous solution containing 80% of dimethyl formamide was added. The polyurethane elastomer thereby partially coagulated was agitated and again dissolved. Next, stearyl alcohol was added and dissolved in an amount of 5% of the amount of the polyurethane therein, and lastly 5 parts of microcrystals of pulp were added and dispersed in the solution. The same synthetic leather substratum as described in (B) of Example 4 was coated with the solution prepared above, to a thickness of about 0.8 mm. The coated film was allowed to coagulate with 20% aqueous solution of dimethyl formamide kept at 25° C. for 30 min., washed with hot water at 70° C. for 30 min., and then dried with hot air at 80° C. The skin of this coated film was cut away by 0.20 mm. by means of a band knife, and the exposed spongy surface was napped with a wire brush to obtain a buck-skin-like sheet.

EXAMPLE 8

To 22% solution of the polyurethane elastomer as described in Example 1 in dimethyl formamide, cetyl alcohol and stearyl alcohol were added in amounts of 4% each to the total amount of the polyurethane elastomer. Into the solution, anatase-type titanium oxide treated with metallic soap was further added and dispersed in an amount of 5% of the amount of the polyurethane elastomer, and the viscosity of the polymer solution was adjusted to 15 poises. The solution was heated to 40° C. for coating use. To 24% solution of the same polyurethane elastomer in dimethyl formamide, sorbitane monostearate of 5% and cetyl alcohol of 8% based on the polyurethene elastomer were added, and the viscosity of the resulting solution was adjusted to 40 poises. This was intended for impregnating solution. A tridimentionalized nylon non-woven cloth which had been compressed and set with polyvinyl alcohol was impregnated with the above impregnating solution. The impregnated cloth was then coated with the coating solution to a thickness of about 1.5 mm. Thereafter, the coated film was coagulated with 30% dimethyl formamide solution adjusted the temperature at 28±0.1° C. for 1 hour, and then left to stand in water at 20° C. for 1 hour to complete the coagulation. The product was washed with hot water at 70° C. for 3 hours, and dried.

The coated film of this sheet contained continuous spores which were large enough to be visible with the naked eye. Also, the substratum was not only composed of the polymer generally in granular form but also contained large mutually communicated pores. The skin of this coated film was ground away by 0.35 mm. by means of a buff machine using #150 sandpaper to obtain a synthetic leather having a suede-like surface and flexible texture.

EXAMPLE 9

To 20% solution of a polyurethane elastomer composed of polybutylene adipate having a mean molecular weight of 1,000 and hydroxyl groups on both terminals, p,p'-diphenylmethane diisocyanate, and tetramethylene glycol (molar ratio=1:2.5:1.5) in dimethyl formamide, stearyl alcohol of 8% and sorbitane monostearate of 6% based on the polyurethane elastomer were added, and the resulting solution was heated to 50° C.

A tridimensionalized non-woven cloth formed of 2-denier mixed spun fibres of nylon and polystyrene (nylon:polystyrene=60:40), weighing 300 g./m.², and which had been compressed and set to a thickness of 1.5 mm. with a polyvinyl alcohol size, was impregnated with the solution prepared beforehand, and the surface was smoothened. Meanwhile, to 22% solution of the same polyurethene elastomer in dimethyl formamide, stearyl alcohol was added in an amount of 5% of the amount of the polyurethane elastomer and water was added in an amount of 8% of the amount of the dimethyl formamide, thereby to prepare a coating solution. Heated to 40° C., the coating solution was supplied on the substratum at a rate of 700 g./m.² (or 150 g./m.² in terms of the polymer). The coated film was allowed to coagulate with 50% aqueous solution of dimethyl formamide adjusted the temperature at 45±1° C. for 30 min., washed with water, and further scoured in hot water for removal of the solvent and polyvinyl alcohol therefrom, and was dried. A microporous sheet material thus obtained was dipped in toluene heated at 70° C. and squeezed. This step was repeated until the polystyrene was extracted and removed from the nylon-polystyrene fibre to obtain a leather-like sheet which possessed good gas permeability, moisture permeability, great surface strength, and soft and flexible texture. If necessary, it is possible to apply the ordinary surfacing techniques to this sheet, for example for colouring, lustering, or smoothening the surface by the conventional methods of dyeing, spraying of solution or emulsion of high molecular weight substances, pressing, or embossing, whereby a sheet resembling natural leather in outward appearance, texture, and properties, can be obtained. The properties of this sheet are compared with those of natural products in Table 3.

TABLE 3

| Property tested | Unit | Sheet of invention | Chromed uppers (cowhide) | Lacquer-finished (cowhide) |
|---|---|---|---|---|
| Weight | G./m.² | 787 | 748 | 1,160 |
| Thickness | Mm | 1.65 | 1.23 | 1.80 |
| Specific gravity | | 0.48 | 0.61 | 0.64 |
| Tenacity | Kg./3 cm | 52 | 67 | 88 |
| Tensile strength | Kg./mm.² | 1.05 | 1.82 | 1.63 |
| Elongation | Percent | 57 | 88 | 74 |
| Young's Module | Kg./mm.² | 1.21 | 0.80 | 1.59 |
| Tear strength | Kg | 3.6 | 4.2 | 5.3 |
| Scott's crumpling resistance | No. of crumples | >10,000 | >10,000 | >10,000 |
| Gas permeability | Time | (¹) | (²) | (³) |
| Moisture permeability | G./m.²/24 hr | 3,450 | 4,380 | 530 |

¹ 7 minutes.
² 3 minutes.
³ More than 2 hours.

EXAMPLE 10

150 parts of polyethylene propylene adipate (molar ratio of ethylene:propylene=9:1) having a mean molecular weight of 1,500 and hydroxyl groups on both terminals, and 50 parts of p,p'-diphenylmethane diisocyanate were reacted at 140° C. to obtain prepolymer, which was dissolved in 400 parts of dimethyl formamide. The chain of the resulting product was extended with the addition of a solution of 12 parts of p,p'-diaminodiphenylmethane in dimethyl formamide at 0° C. To this solution, 5 parts of stearly alcohol were added and thoroughly dissolved with an increase in the temperature to 60° C. The resulting solution was flown and spread over a flat, smooth plate to a thickness of 1 mm., washed with warm water at 50° C. for 30 min., and dried with hot air at 80° C. The film thus obtained had a uniform and invisible microporous sponge structure. This film was bonded by lamination on a substratum for synthetic leather in the same manner as in (C) of Example 1, and the surface was finished. A sheet having an appearance similar to natural leather was obtained.

What we claim is:
1. In a method of manufacturing microporous sheet material for an imitation leather which comprises the steps of:
    (1) impregnating or coating a substrate with a polyurethane elastomer in an organic solvent;
    (2) treating this product in a bath comprising a coagulating liquid for said polyurethane elastomer, which liquid is at least partially miscible with said organic solvent to obtain a cellular polyurethane structure having mutually communicated micropores;
    (3) removing said organic solvent from the thus obtained cellular polyurethane; and
    (4) removing said coagulating liquid from the resulting product,
the improvement which comprises dissolving from 0.1 to 50 weight percent based on the elastomer of a coagulation regulating agent in the polyurethane elastomer solution, which agent is substantially insoluble in the coagulating liquid and has a moderate degree of miscibility with said polyurethane elastomer, said agent being selected from the group consisting of
    (a) aliphatic carboxylic acids having 8 to 31 carbon atoms,
    (b) alkyl alcohol esters derived from the reaction between alkyl alcohols having from 1 to 6 carbon atoms and aliphatic carboxylic acids having from 10 to 22 carbon atoms,
    (c) alkyl alcohol esters derived from the reaction between alkyl alcohols having from 7 to 18 carbon atoms and aliphatic carboxylic acids having from 6 to 18 carbon atoms,
    (d) alkyl alcohol esters derived from the reaction of alkyl alcohols having from 8 to 18 carbon atoms and aliphatic carboxylic acids having 1 to 3 carbon atoms,
(e) glycerine mono-, di- and triesters of aliphatic carboxylic acids having from 10 to 22 carbon atoms,
(f) sorbitane mono-, di- and triesters of aliphatic carboxylic acids having from 10 to 22 carbon atoms,
(g) α,ω-glycols having hydroxyl groups on both terminals and having 6 to 22 methylene groups,
(h) ethers which contain alkyl groups having from 6 to 18 carbon atoms,
(i) ketones which contain alkyl groups having from 6 to 18 carbon atoms, and
(j) aliphatic aldehydes having from 6 to 18 carbon atoms.

2. A method according to claim 1 wherein said coagulation regulating agent is selected from the group consisting of caprylic acid, capric acid, lauric acid, myristic acid, palmitic acid, stearic acid, arachic acid and melissic acid.

3. A method according to claim 1 wherein said coagulation regulating agent is selected from the group consisting of sorbitane monostearate, sorbitane distearate, sorbitane dilaurate, glyceride monostearate, methyl palmitate and octadecyl stearate.

4. A method according to claim 1 wherein said coagulation regulating agent is selected from the group consisting of stearic aldehyde, octadecyl ether, dinonyl ketone and decane diol.

5. A method according to claim 1 wherein said organic solvent is selected from the group consisting of dimethyl formamide, diethyl formamide, dimethyl acetamide, diethyl acetamide, dimethyl sulfoxide and tetrahydrofuran.

6. A method according to claim 1 wherein said coagulating liquid is selected from the group consisting of water, methanol, isopropanol and toluene.

7. A method according to claim 1 wherein said coagulating liquid is an aqueous solution of dimethyl formamide.

8. A method according to claim 1 wherein said organic solvent is dimethyl formamide and the coagulating liquid is an aqueous solution of dimethyl formamide.

9. A method according to claim 1 wherein the treating bath is at a temperature below the melting point of said coagulation regulating agent.

10. The method according to claim 1 wherein the substrate is a non-woven fibrous mat.

11. The method according to claim 1 wherein the substrate is impregnated with the polymer solution and at least one surface of said substrate is coated with said solution.

12. The method according to claim 1 wherein the coagulation regulating agent has a melting point in the range 30°–70° C.

13. The method according to claim 10 wherein the coagulation regulating agent comprises sorbitane monostearate and the organic solvent is dimethyl formamide.

14. The method according to claim 10 wherein the coagulating regulating agent comprises sorbitane distearate and the organic solvent is dimethyl formamide.

References Cited

UNITED STATES PATENTS 3,348,963 10/1967 Fukushima et al. _____ 117—63

WILLIAM D. MARTIN, Primary Examiner

T. G. DAVIS, Assistant Examiner

U.S. Cl. X.R.

117—135.5, 140, 161